(12) United States Patent
Kang et al.

(10) Patent No.: US 8,239,361 B2
(45) Date of Patent: Aug. 7, 2012

(54) METHOD AND SYSTEM FOR USER CENTERED INFORMATION SEARCHING

(75) Inventors: Seok Ho Kang, Seongnam-si (KR);
Dohwan Kang, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 229 days.

(21) Appl. No.: 12/667,838

(22) PCT Filed: Jun. 16, 2008

(86) PCT No.: PCT/KR2008/003366
§ 371 (c)(1),
(2), (4) Date: Jan. 5, 2010

(87) PCT Pub. No.: WO2009/020283
PCT Pub. Date: Feb. 12, 2009

(65) Prior Publication Data
US 2011/0016125 A1    Jan. 20, 2011

(30) Foreign Application Priority Data

Aug. 8, 2007    (KR) ......................... 10-2007-0079746

(51) Int. Cl.
*G06F 17/30* (2006.01)
(52) U.S. Cl. ......... 707/706; 707/710; 707/731; 707/737
(58) Field of Classification Search .......... 707/706–731, 707/737
See application file for complete search history.

(56) References Cited

U.S. PATENT DOCUMENTS

| 6,018,760 A | 1/2000 | Oishi et al. |
| 6,691,114 B1 | 2/2004 | Nakamura |
| 7,275,063 B2 * | 9/2007 | Horn ....................................... 1/1 |
| 2002/0169768 A1 | 11/2002 | Lowe et al. |
| 2004/0088287 A1 | 5/2004 | Elder et al. |
| 2006/0106824 A1 * | 5/2006 | Stuhec .......................... 707/100 |
| 2006/0212432 A1 * | 9/2006 | Tsai ................................ 707/3 |
| 2007/0038616 A1 * | 2/2007 | Guha ................................ 707/4 |
| 2007/0061294 A1 * | 3/2007 | Parnell et al. ..................... 707/3 |
| 2008/0082959 A1 * | 4/2008 | Fowler ........................ 717/104 |
| 2008/0114745 A1 * | 5/2008 | Gideoni et al. .................. 707/4 |
| 2009/0024604 A1 * | 1/2009 | Zhao et al. ...................... 707/5 |
| 2009/0157711 A1 * | 6/2009 | Baer et al. ..................... 707/101 |
| 2011/0258173 A1 | 10/2011 | Ratiner et al. |

FOREIGN PATENT DOCUMENTS

| KR | 1020010093775 | 10/2001 |
| KR | 10-2001-0108845 | 12/2001 |
| KR | 1020020090816 | 12/2002 |

(Continued)

OTHER PUBLICATIONS

Non-Final Office Action issued on Dec. 23, 2011 in U.S. Appl. No. 12/680,691.

(Continued)

*Primary Examiner* — Hanh Thai
(74) *Attorney, Agent, or Firm* — H. C. Park & Associates, PLC (57) ABSTRACT

Disclosed is a method and system for user-centered information search. The user-centered information search may include generating an object as a classification unit of an information search structure and a property of the object, generating a class and determining a property of the class using the object; and detecting a search result corresponding to an information request from a user using at least one of the object, property, and class.

36 Claims, 8 Drawing Sheets

FOREIGN PATENT DOCUMENTS

| | | |
|---|---|---|
| KR | 1020040005913 | 1/2004 |
| KR | 10-2006-0104544 | 10/2006 |
| WO | 00/19340 | 4/2000 |
| WO | 2006/014562 | 2/2006 |

OTHER PUBLICATIONS

Final Office Action issued on Jun. 4, 2012 for U.S. Appl. No. 12/680,691.

* cited by examiner

METHOD AND SYSTEM FOR USER CENTERED INFORMATION SEARCHING

CROSS-REFERENCE TO RELATED APPLICATIONS

This application is the National Stage of International Application No. PCT/KR2008/003366, filed Jun. 16, 2008, and claims priority from and the benefit of Korean Patent Application No. 10-2007-0079746, filed on Aug. 8, 2007, which are both hereby incorporated by reference for all purposes as if fully set forth herein.

BACKGROUND OF THE INVENTION

1. Field of the Invention

The present invention relates to a method and system for user-centered information search, particularly, to a method and system which can perform an information search close to a user's intention.

2. Discussion of the Background

Nowadays, an information search through a communication network has become common along with development of the communication network. That is, an Internet user may simply obtain desired information whenever and wherever the user desires and the information search brings many changes throughout our lives.

Accordingly, an Internet search service operator to a support search service appears to provide related-information corresponding to a query from a user who wants to search. Also, the operator establishes various information search structures to search for information desired by the user.

An integration search structure, which is one of the various information search structures, extracts information related to the query of the user from a database maintained in each type of information, arranges the information for each database, and shows the information to the user. However, the integration search structure is configured for each database and shows information from each database, and thereby has limit to satisfy intention of the user's query Also, a browsing structure, another example of information search structure, is utilized based on an editor's arbitrary classification rather than being utilized based on the intention of a user's information search, and thereby has limit to satisfy the user.

Accordingly, a method and system which can establish an information search structure to provide search information close to the intention of user's information search and can perform user-centered information search using the information search structure is absolutely required.

SUMMARY OF THE INVENTION

An aspect of the present invention provides a method and system for a user-centered information search which generates an object and property as a classification unit of an information search structure, and thereby can accurately detect a search result congruent to an intention of a user's search.

Another aspect of the present invention also provides a method and system for a user-centered information search which group at least one object into the same group to generate a class, and thereby can effectively generate an information search structure.

Another aspect of the present invention also provides a method and system for a user-centered information search which receive an information request from a user, and thereby can effectively detect a search result proper to user's search.

Another aspect of the present invention also provides a method and system for a user-centered information search which can be commonly applied to both classification of information search structure and a search for specific data to be provided to the user.

Another aspect of the present invention also provides a method and system for a user-centered information search which provide an effective classification result compared to an established resource of information search structure.

According to an aspect of the present invention, there is provided a method for user-centered information search, the method including: generating an object as a classification unit of an information search structure and a property of the object, generating a class and determining a property of the class using the object, and detecting a search result corresponding to an information request from a user using at least one of the object, property, and class.

Also, in an aspect of the present invention, the generating of the object and the property of the object including: generating the object as the classification unit of the information search structure, the object being a target of information, and generating the property of the object, the property being related-information.

Also, in an aspect of the present invention, the generating of the class and the determining of the property including: grouping at least one object into the same group according to a predetermined classification criterion to generate a class, and determining the property of the class using an object included in the class.

Also, in an aspect of the present invention, the detecting of the search result corresponding to the information request from the user including: receiving the information request including the object, and detecting a search result corresponding to the information request using at least one of the object, property, and class.

Also, in an aspect of the present invention, the detecting of the search result corresponding to the information request from the user using at least one of the object, property, and class further including: grouping at least one object included in the class according to a predetermined criterion to generate a group, and detecting a search result corresponding to the information request from the user using at least one of the object, property, class, and group.

Also, in an aspect of the present invention, the detecting of the search result corresponding to the information request from the user using at least one of the object, property, class, and group including: generating a subordinate sub-class having an additional property in addition to a property of the class, and detecting a search result corresponding to the information request from the user using at least one of the object, property, class, sub-class, and group.

According to another aspect of the present invention, there is provided a system for user-centered information search, the system including: an object/property generating module to generate an object as a classification unit of an information search structure and a property of the object, a class conducting module to generate a class and to determine a property of the class using the object, and a search result detecting module to detect a search result corresponding to an information request from a user using at least one of the object, property, and class.

An aspect of the present invention provides a method and system for a user-centered information search which generate an object and property as a classification unit of an information search structure, and thereby can accurately detect a search result congruent to an intention of a user's search.

Another aspect of the present invention also provides a method and system for a user-centered information search which group at least one object into the same group to generate a class, and thereby can effectively generate an information search structure.

Another aspect of the present invention also provides a method and system for a user-centered information search which receive an information request including an object from a user, and thereby can effectively detect a search result proper to user's search.

Another aspect of the present invention also provides a method and system for a user-centered information search which can be commonly applied to both classification of information search structure and a search for specific data to be provided to the user.

Another aspect of the present invention also provides a method and system for a user-centered information search which provide an effective classification result compared to an established resource of information search structure.

DETAILED DESCRIPTION OF THE ILLUSTRATED EMBODIMENTS

Although a few exemplary embodiments of the present invention have been shown and described, the present invention is not limited to the described exemplary embodiments, wherein like reference numerals refer to the like elements throughout.

Figure 1:
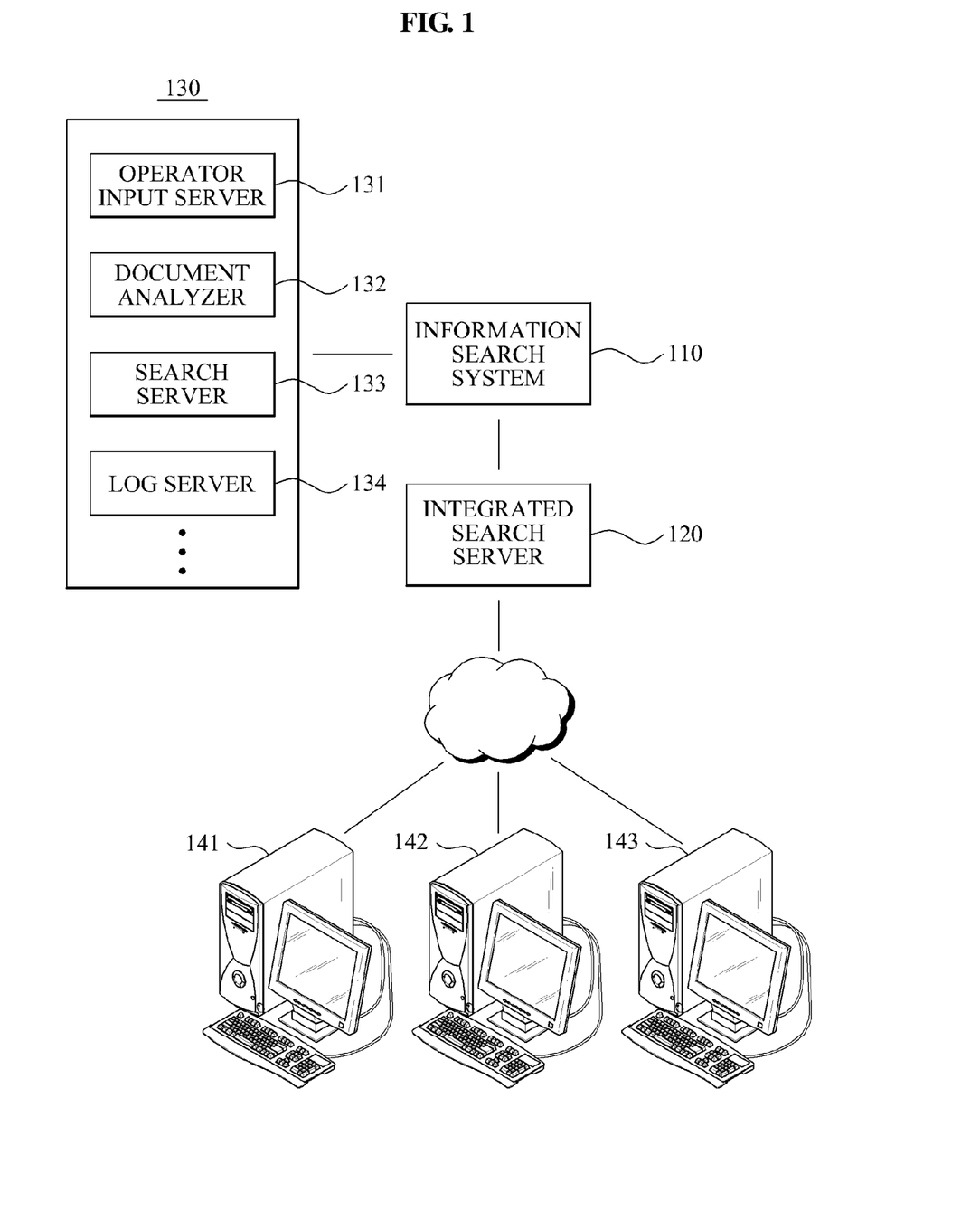
FIG. 1 briefly illustrates a method and system for user-centered information search according to an example embodiment of the present invention.

FIG. 1 briefly illustrates a method and system for user-centered information search according to an example embodiment of the present invention.

Referring to FIG. 1, an integrated search server 120 may transmit an information request to a user-centered information search system 110 in response to search request received from users 141, 142, or 143. Also, the user-centered information search system 110 may detect a search result corresponding to the information request received from the integrated search server 120.

The user-centered information search system 110 may establish information search structure improved to detect a search result close to intention of a user's information search. A classification unit constituting the information search structure includes an object, property, class, sub-class, and group. In this instance, the user-centered information search system 110 has correlations between each of the classification units.

The user-centered information search system 110 may receive source information from a source server 130 to generate the object, property, class, sub-class, and group. The source server 130 may includes an operator input server 131, document analyzer 132, search server 133, and log server 134. The user-centered information search system 110 may generate or renew/manage the object, property, class, sub-class, and group using the source information.

The user-centered information search system 110 may analyze the information request received from the integrated search server 120, and thereby can detect a search result corresponding to the information request. Also, the information request may be comprised of an object and property. The user-centered information search system 110 may detect a search result proper to the information request using classification system included in the established information search structure. In this instance, the user-centered information search system 110 may determine a display order of priority with respect to each classification unit to detect the search result. Also, the user-centered information search system 110 may determine specific data of the property and the specific data may be included in the search result. Also, the user-centered information search system 110 may transmit the search result to the integrated search server 120.

Figure 2:
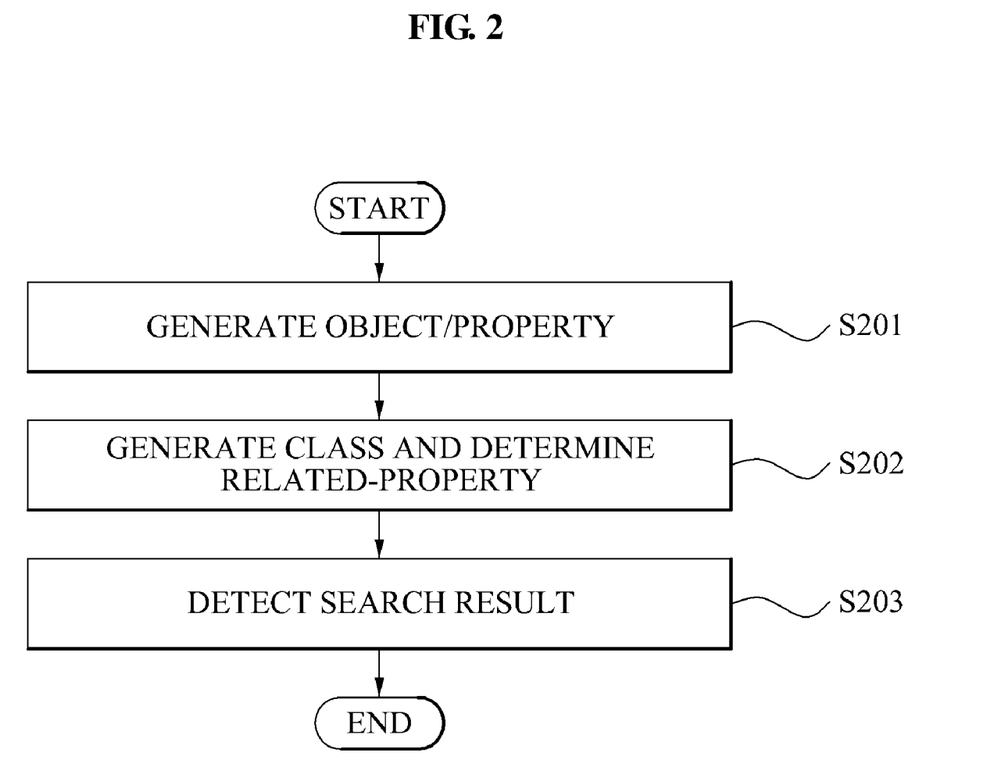
FIG. 2 is an operational flowchart illustrating a method for user-centered information search according to an example embodiment of the present invention.

FIG. 2 is an operational flowchart illustrating a method for user-centered information search according to an example embodiment of the present invention.

As illustrated in FIG. 2, a method for a user-centered information search is performed in operations S201 to S203. Also, the method for the user-centered information search is performed by a user-centered information search system 110.

In operation S201, the user-centered information search system 110 may generate an object as a classification unit of an information search structure and a property of the object. The information search system 110 may establish an information search structure to detect a search result corresponding to an information request from a user. In this instance, the classification unit of the information search structure may be the object and the property. That is, the object and the property may be a fundamental classification unit of the information search structure. Also, operation S201 will be described in detail in the description of operations S301 and S302 of FIG. 3.

In operation S202, the information search system 110 may generate a class and determine a property related to the class using the object. The information search system 110 may generate the class which is the classification unit of the information search structure. Also, the class may be a set of the object. Also, the class may include synonyms for the class. Also, operation S202 will be described in detail in the description of operations S303 and S304 of FIG. 3.

In operation S203, the information search system 110 may detect the search result corresponding to the information request from the user using at least one of the object, property, and class. That is, the information search system 110 may receive the information request from the user, and detect the search result corresponding to the information request using the object, property, and class. Also, operation S203 will be described in detail in the description of operations S305 and S306 of FIG. 3.

Also, according to an example embodiment, in operation S203, the information search system 110 may define a specific data type for the property of the object, generate a specific data, determine a display order of priority among at least one property of the object, and detect the search result corresponding to the information request from the user using at least one of the object, property, class, specific data, and display order of priority.

Specifically, the information search system 110 may generate the object, at least one property of the object, and specific data of each property. Also, the display order of priority of each property is determined. Also, the information search system 110 may extract an object corresponding to an information request received from an information search server, and extract a property of the object. Also, the information search system 110 may determine a property to be provided as a search result based on the display order of priority. Also, the information search system 110 may provide a specific data of the property to be provided as the search result. In this instance, the specific data type is defined according to at least one defined criterion of a correct-answer type/incorrect-answer type, static/dynamic, contents/link, and single/plural.

Also, the search result may be at least one of a search-result type of a search result and a final contents page-type of the search result. Also, the search result may be comprised of at least one of a property corresponding to the information request from the user, a specific data of the corresponding property and a related object list corresponding to the information request. The search result will be described in detail in FIG. 7 later.

Figure 3:
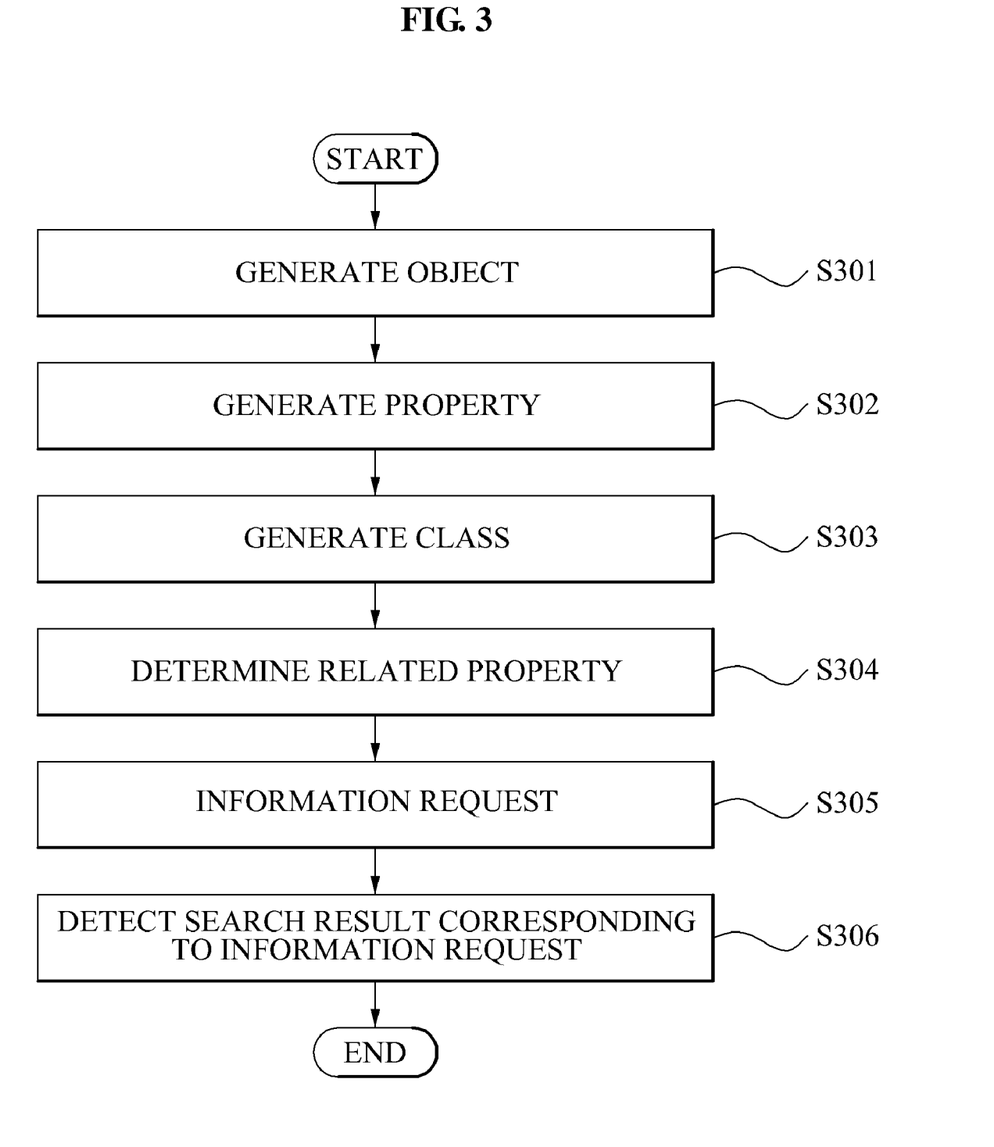
FIG. 3 is an operational flowchart illustrating another method for user-centered information search according to an example embodiment of the present invention.

FIG. 3 is an operational flowchart illustrating another method for user-centered information search according to an example embodiment of the present invention. As illustrated in FIG. 3, a method for user-centered information search is performed through a user-centered information search system 110.

In operation S301, the user-centered information search system 110 may generate an object as a classification unit of an information search structure, the object being a target of information. Also, the information search system 110 may establish the information search structure to detect a search result corresponding to an information request from a user.

According to the present invention, the information request may be expressed and comprised of the object and a property. Also, an information unit may be comprised in the same manner. That is, the information request from the user can be expressed with the object and property, the search result corresponding to the information request is also possible to express with the object and property. Furthermore, the object and property indicates the classification unit of the information search structure, and the information search system 110 may detect a specific data of each property.

In this instance, the object may be generated using at least one of a query log analysis, a related-search word analysis, a document analysis, an operator input and an external database interlock. Specifically, the object may detect a query which is not registered as an object and property using query log, and is generated using an inconsequential word of the detected query. Also, the object may be generated using an uninflected word of a word extracted by checking the related-search word log. Also, the information search system 110 may automatically classify a document according to a rule, detect an object candidate group, and generate the object through an inconsequential word of the candidate group. Also, the object may be generated by a request of an operator and user, and may also be generated by interoperating with existing internal/external databases.

In operation S302, the information search system 110 may generate the property which is a related-information of the object. In this instance, the object indicates a target of information, and the property of the object for information search is any one of a specific character of the object, contents of the object, expression form of the object, detail information of the object, and source of the object. In this instance, the object may have at least one property. For example, property of an object, "nhn", may have various properties, such as "stock prices", "location", "recruitment information", and the like. Also, the object and property may be expressed with at least one keyword. Also, the object and property may include synonyms. For example, from words "nhn stock prices" and "NHN stock", the words "nhn" and "NHN" are keywords to express the same object. In the same manner, from words "nhn stock prices" and "nhn current prices", the words "stock prices" and "current prices" are keywords to express the same property.

Also, among keywords which express a property, there may be keywords which are not related to a related-object, and there may be keywords which are subordinate to an object. For example, from words "Lee, Hyolee latest music", "Lee, Hyolee hit song", "Lee, Hyolee Deep", the words "latest music" and "hit song" express a property of "music" regardless of the object "Lee, Hyolee". The word "Deep", which is a title of a song of Lee, Hyolee, is a keyword to express the property of "music" only in the case of "Lee, Hyolee".

Also, the property is generated using at least one of an object prefix analysis for the object, object suffix analysis for the object, object-related search word analysis for the object, an object click analysis for the object, an object document analysis for the object, an operator input, and the external database interlock. Specifically, the property may be generated by respectively searching a prefix, suffix, related-search word of the object, and excluding a name of the object from each retrieved word, and thereafter generalizing remain portion of the retrieval word. Also, the property may be generated by searching for information of an area where a click occurs as a search for the object is performed. Also, the property may be generated from a document provided as searching for the object is preformed. Also, the property may be generated by a request of an operator and user, and may also be generated by interoperating with existing internal/external databases.

In operation S303, the information search system 110 may group at least one object according to a predetermined classification criterion to generate a class. Also, the information search system 110 may generate the class with a set of objects having a common property. For example, objects, such as "nhn", "daum", "yahoo", and the like, may be gathered in a class, "Internet portal company".

Also, the information search system 110 gathers objects of similar classification according to a predetermined classification criterion, and thereby can generate the class. For example, the information search system 110 may gather objects of similar classification according to the predetermined classification criterion, extract a common portion of the gathered objects, and perform generalizing of the common portion. In this instance, the information search system 110 may generate the class that has a word generated from the generalizing as a property.

In other words, the information search system 110 may generate the class with a group of object properties of which are determined, and determine a common property of the objects in the class as a property related to the class. Also, the information search system 110 may gather objects according to a predetermined criterion, extract a property from the gathered objects, and generate a class with the property. Also, the objects included in the class may have a common property set. For example, a class, "singer", such as "Lee, hyolee", "Rain", "Chaeyeon", and the like may have a common property such as "personal information", "official site", "latest music".

Also, a specific object may have a property different from those of other objects in a corresponding class. For example, when an object, "Lee, Hyolee", included in a class, "singer", may have "phone" as a property, however, another object "Rain" cannot have the "phone" as a property because "Lee, Hyolee phone" exists, but "Rain phone" does not.

In operation S304, the information search system 110 may determine a property of the class using the object included in the class. In this instance, the property of the class may be the common property of the object in the class.

As illustrated in S303, the information search system 110 may generate the property of the object, generate the class using the object, and determine the common property of the object included in the class as the property of the class. Also, the information search system 110 may gather objects of similar classification to determine the common property, and determine the class using the common property. That is, the object, property, and class have correlations between them. The classification units in the information search structure may provide information search service proper to user's intention.

In operation S305, the information search system 110 may receive an information request including the object from the user. In this instance, the information request may include at least one of the object and property. That is, the information request may be expressed and comprised of the object and property. The user may input an information request in a type of the information request including the object and property, and the information search server may transmit the information request to the information search system 110. For example, the user may input "NHN current prices" as the information request, and the information system may determine "nhn stock prices" as a search result. In this instance, the information search system 110 may analyze the request information in consideration that "NHN" is the object, and the "current prices" is the property. Also, the information search system 110 may detect a search result, "nhn" recognized as the same object to the "NHN", "stock prices" recognized as the same object to the "current prices", and specific data with respect to the "stock price".

Also, the user may input the information request in the type of the information request including the object to an integrated search server 120, and the integrated search server 120 may transmit the information request to the information search system 110. For example, the user may input "NHN" as the information request, the information search system 110 may detect a search result such as "nhn property", "nhn stock prices", "nhn latest issue", and the like. Also, the information search system 110 may detect related-information such as a class including an object included in the information request, sub-class, object list, and property list as a search result.

In operation S306, the information search system 110 may detect a search result corresponding to the information request using at least one of the object, property, and class. Also, the information search system 110 may detect the search result corresponding to the information request using respective correlations between the object, property and class. For example, the user may input "NHN" as an information request, and in response to this, the information search system 110 may recognize the "NHN" as an object. Also, the information search system 110 may extract and detect properties of the object, "NHN", as a search result. Also, the search result may be determined according to a display order of priority among the extracted properties.

Also, the search result may include a specific data of the extracted properties. Also, the information search system 110 may detect every object list in the class including the "NHN" as the search result.

Also, a correlation between the object and class indicates a category structure of information, and the object may be a subcategory of classification of a specific subject that the class expresses. That is, at least one object may be composed for each category through each class, and an object included in a class that is a category, may be a subcategory of classification of a specific subject that the class expresses.

Figure 4:
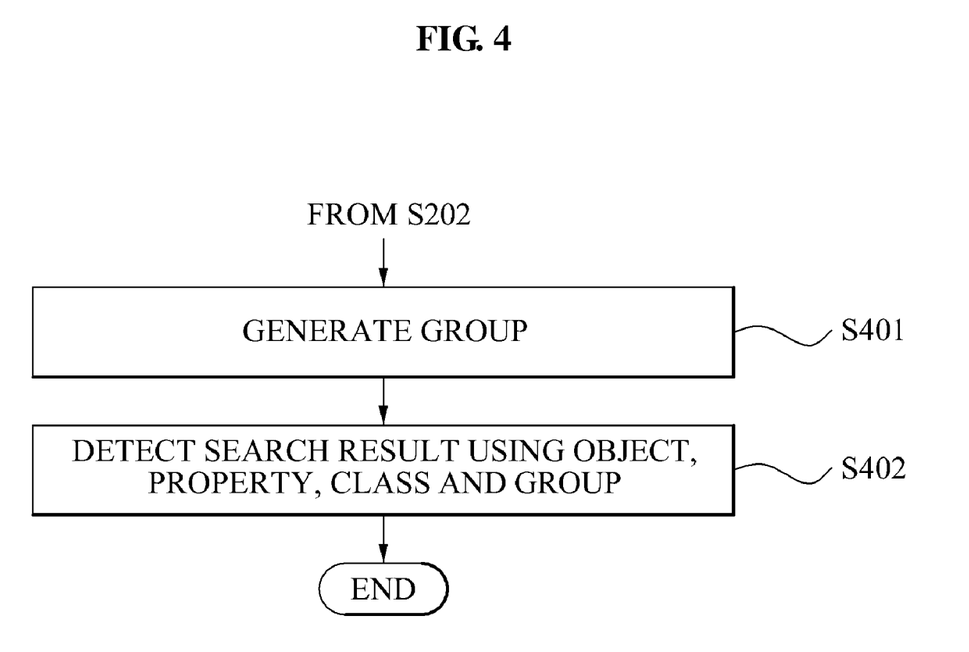
FIG. 4 is an operational flowchart illustrating operations of detecting a search result corresponding to an information request from a user according to an example embodiment of the present invention.

FIG. 4 is an operational flowchart illustrating operations of detecting a search result corresponding to an information request from a user according to an example embodiment of the present invention.

As illustrated in FIG. 4, according to an example embodiment, operation S203 which detect a search result corresponding to an information request from a user may be performed in operations S401 and S402. Also, operation S203, may be performed through a user-centered information search system 110.

In operation S401, the user-centered search system may group at least one object included in a class according to a predetermined criterion to generate a group. That is, the group may be a set of at least one object that can be grouped according to a predetermined criterion among a plurality objects included in the same class. For example, objects included in a class, "Internet company", may be grouped into a group such as "game company", "search company", "community company", and the like. For example, objects included in a class, "university", may be grouped into a group such as "metropolitan university" and "provincial university" according to a regional criterion, and may be grouped into a group such as "four-year university" and "two-year college", and the like according to a period criterion.

In operation S401, the information search system 110 may detect the search result corresponding to the information request from the user using at least one of the object, property, class, and group. Also, the information search system 110 may detect the search result corresponding to the information request using respective correlations between the object, property, class, and group.

For example, when a user input "hangame" as the information request, the information search system 110 may recognize the "hangame" as an object. Also, the information search system 110 may extract and detect a property of the object, "hangame", as a search result. Also, the information search system 110 may determine a group such as "flash game", "console game", and "online game" in a class "game" where the object, "hangame" belongs as a search result. Also, the search result may include an object list included in the group, and a property list with respect to an object included in the group.

Also, a correlation between the object and class/group indicates a category structure of information, and the object is a subcategory of classification of a specific subject. That is, at least one object may be composed for each category through each class/group, and an object included in the class/group, category, may be a subcategory of classification of a specific subject.

Figure 5:
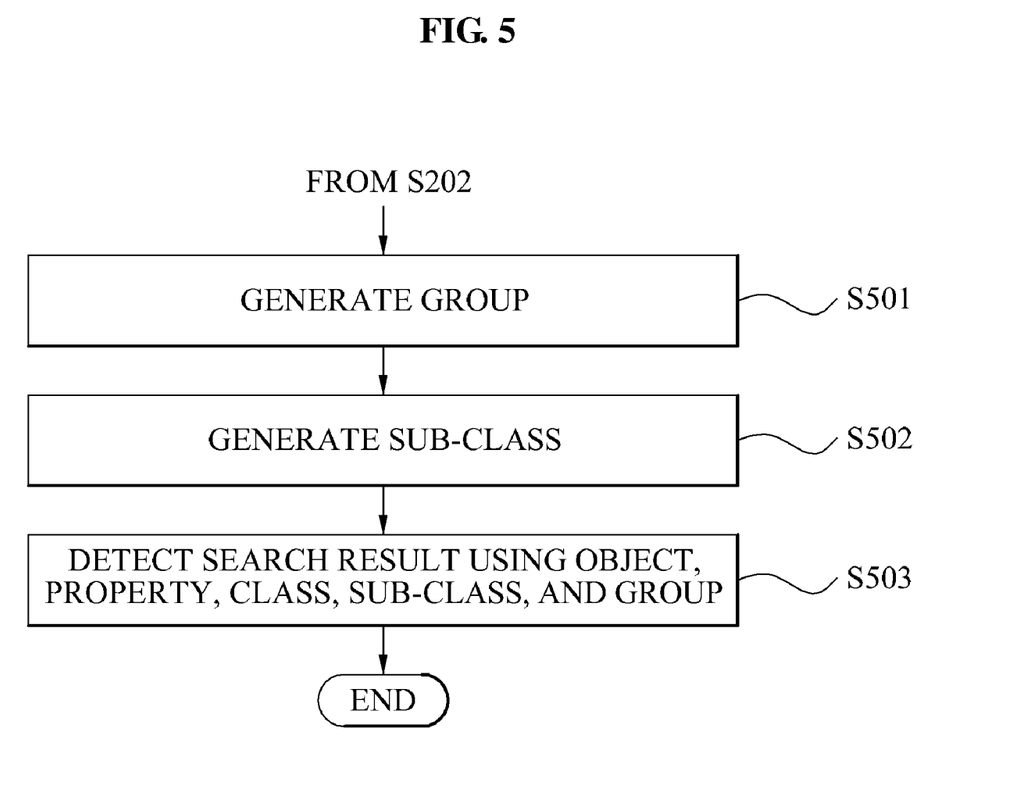
FIG. 5 is an operational flowchart illustrating operations of detecting a search result corresponding to an information request from a user according to an example embodiment of the present invention.

FIG. 5 is an operational flowchart illustrating operations of detecting a search result corresponding to an information request from a user according to an example embodiment of the present invention.

As illustrated in FIG. 5, according to an example embodiment, operation 5203 which detect a search result corresponding to an information request from a user may be performed in operations 5501 and 5503. Also, operation 5203, may be performed through a user-centered information search system 110.

In operation 5501, the user-centered information search system 110 may group at least one object included in a class according to a predetermined criterion to generate a group. Operation 5501 may be performed in the same manner of operation 5401 as described above.

In operation 5502, the information search system 110 may generate a subordinate sub-class having an additional property in addition to a property of the class. For example, the information system may generate a sub-class such as "entertainer", "singer", and the like with respect to a class, "person".

In operation S503, the information search system 110 may detect a search result corresponding to an information request using at least one of the object, property, class, sub-class, and group. Also, the information search system 110 may detect the search result corresponding to the information request using respective correlations between the object, property, class, sub-class, and group. That is, the object may be included in the class/sub-class/group, the object may include at least one property, and the class/sub-class/group may have common property. Moreover, the object may have a property of the object included in the class/sub-class/group in addition to class/sub-class/group.

Also, respective correlations between the class, sub-class, and group indicate a hierarchical model structure of information, and the class is in upper-lower relationship with each of the sub-class and group, and each of the sub-class and group is a specific classification subject. Accordingly, the information search system 110 may detect the search result more effectively and systemically.

Figure 6:
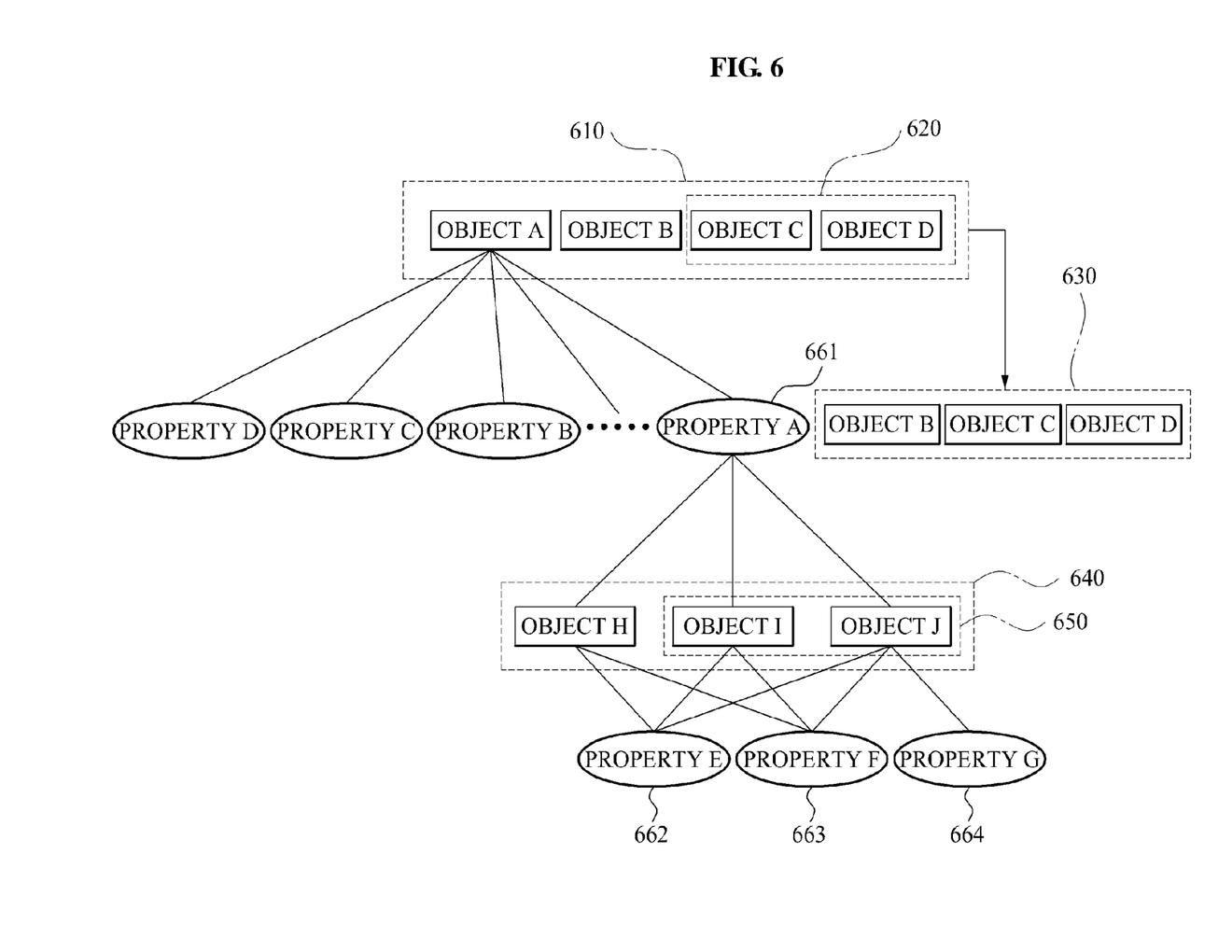
FIG. 6 illustrates correlations between an object, property, class, sub-class, and group according to an example embodiment.

FIG. 6 illustrates correlations between an object, property, class, sub-class, and group according to an example embodiment. Referring to FIG. 6, an object A may have at least one property. Also, objects A to D may be included in a single class 610. Also, the user-centered information search system 110 may group objects included in the class 610 according to a predetermined classification criterion to generate a group 620. Also, the information system may include a property of the class 610, and generate a subordinate sub-class 630 having an additional property.

Also, a property A 661 which is a property of the object A may be a common property of objects H to object J. A class 640 may include the objects H to object J. A property of the class 640 may include the property A 661, a property E 662, a property F 663, and a property G 664. Particularly, the property A 661, property E 662, and property F 663 may be a common property of the class 640. Also, the object J may have a property G different from properties of other objects in the class 640 where the object J belongs. Also, the class 640 may include a group 650.

For example, when assuming that the object A is "mp3", the object A may have a variety of properties, such as "download", "review", "price comparison", and "model". In this instance, the property "model" may be a common property of other objects such as "IPOD®", "IPOD SHUFFLE®", "IRIVER® u10", and the like. Also, the objects "IPOD®", "IPOD SHUFFLE®", "IRIVER® u10" may compose a single class, and the class may have a common property such as "model", "review", and "price comparison", and the like.

Figure 7:
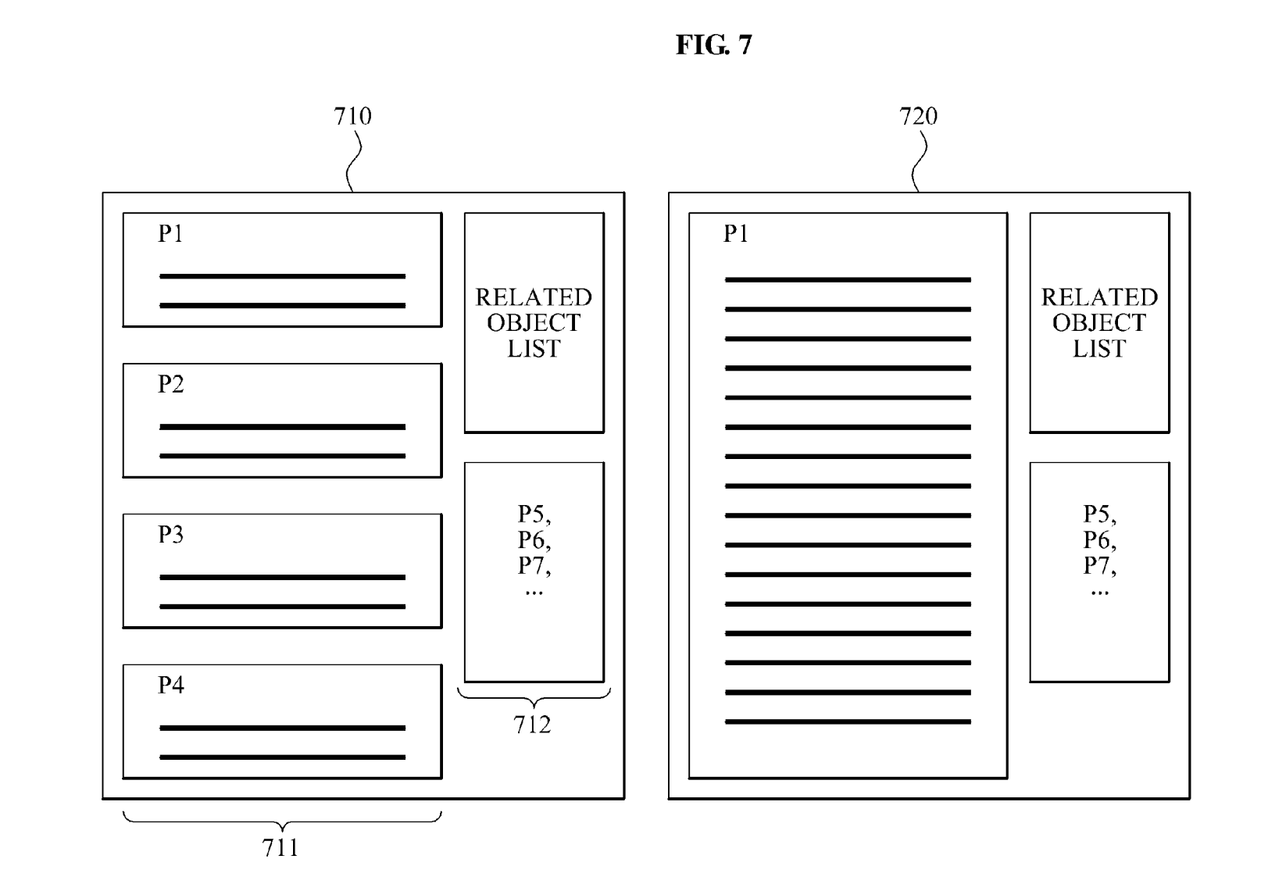
FIG. 7 illustrates an example of a detected search result according to the present invention.

FIG. 7 illustrates an example of a detected search result according to the present invention. As illustrated in FIG. 7, a search result corresponding to information request from a user may be a search-result type of a search result 710 or a final contents page-type of the search result 720. However, search results 710 to 720 are only examples, and a variety of search result page can be included in examples of the present invention.

The search-result type of a search result 710 may include a property as the search result corresponding to the information request. As previously described in the description of FIG. 3, a user-centered information search system 110 may detect a property of an object included in the information request as the search result. Also, the information search system 110 may determine a display order of priority of the property of the object included in the information request to reflect the same in the search result. According to an example of the present invention, the search-result type of a search result 710 may sequentially include properties according to the display order of priority in a main information region 711. Also, the search-result type of a search result 710 may include an additional information region 712 which is to link to an object related to the information request or to link to an unselected property in the main information region 711. Also, the related-object may be a class or a group which includes the object included in the information request, or may be a list of other objects of a sub-class.

Also, the final contents page-type of the search result 720 may include a single property proper to the information request and specific data of the single property. Also, the final contents page-type of the search result 720 may include an object list related to the information request and unselected property information in the main region.

Figure 8:
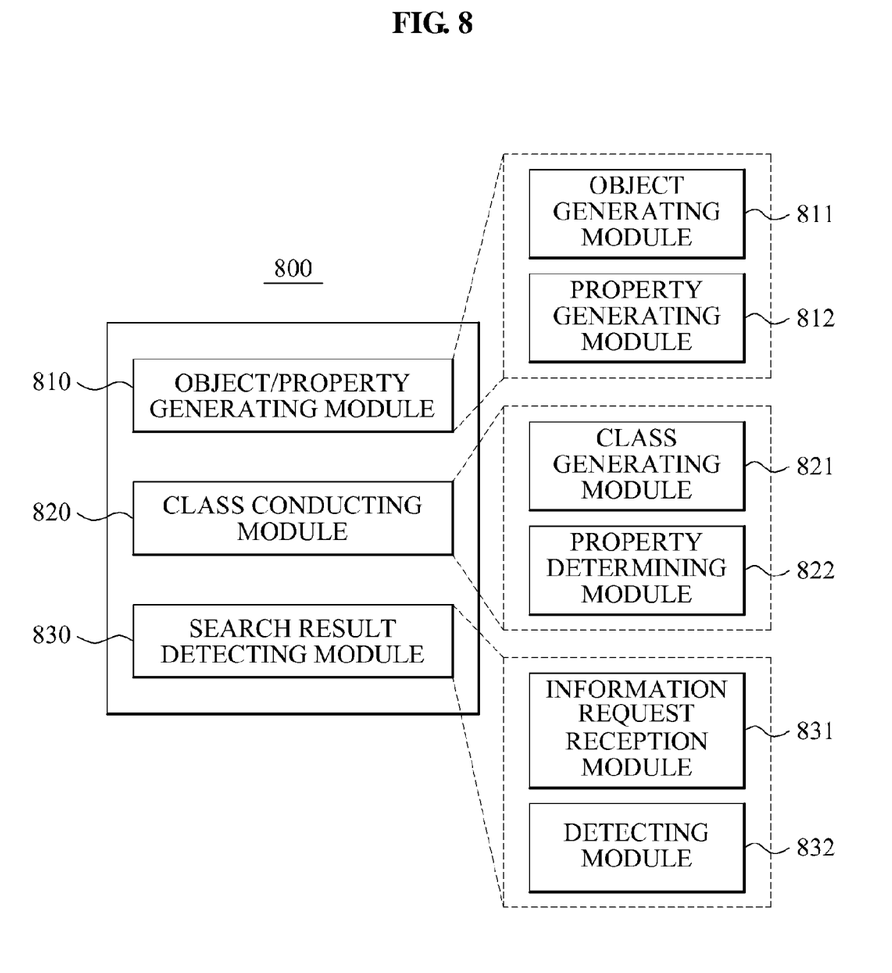
FIG. 8 illustrates a user-centered information search system according to an example embodiment.

FIG. 8 illustrates a user-centered information search system 800 according to an example embodiment.

As illustrated in FIG. 8, according to an example embodiment, a user-centered information search system 800 may include an object/property generating module 810, a class conducting module 820, and search result detecting module 830.

The object/property generating module 810 may generate an object as a classification unit of information search structure and a property of the object. Also, as illustrated in FIG. 8, the object/property generating module 810 may include an object generating module 811 and a property generating module 812.

The object generating module 811 may extract an object which is a classification unit of the information search structure and also a target of information. In this instance, the object may be generated using at least one of a query log analysis, a related-search word analysis, a document analysis, an operator input and an external database interlock.

The property generating module 812 may generate a property related to the object. In this instance, the property may be any one of a specific character of the object, contents of the object, expression form of the object, detail information of the object, and source of the object. Also, the property is generated using at least one of an object prefix analysis for the object, object suffix analysis for the object, object-related search word analysis for the object, an object click analysis for the object, an object document analysis for the object, an operator input, and the external database interlock.

The class conducting module 820 may generate a class using the object and determine a property related to the class. In this instance, the object, property, and class are expressed with at least one keyword. Also, as illustrated in FIG. 8, the class conducting module 820 may include the class generating module 821 and property determining module 822.

The class generating module 821 may group at least one object according to a predetermined classification criterion into the same group to generate a class.

The property determining module 822 may determine a property of the class using the object included in the class. Also, the property of the class may be a common property of the object in the class.

The search result detecting module 830 may detect a search result corresponding to an information request from a user using at least one of the object, property, and class. As illustrated in FIG. 8, the search result detecting module 830 may include an information request reception module 831 and a detecting module 832.

The search result detecting module 830 may receive an information request including the object. In this instance, the information request may include at least one of the object and property.

The detecting module 832 may detect a search result corresponding to the information request using at least one of the object, property, and class. Also, the detecting module 832 may detect the search result using respective correlations between the object, property, and class.

In an aspect to the present invention, the search result detecting module 830 may include a data generating module (not illustrated) to define a specific data type for the property of the object and generate the specific data, a priority determining module (not illustrated) to determine a display order priority among at least one property of the object, and a detecting module (not illustrated) to detect a search result corresponding to the information request from a user using the at least one of the object, property, class, specific data and display order of priority. In this instance, the specific data type is defined according to at least one defined criterion of a correct-answer type/incorrect-answer type, static/dynamic, contents/link, and single/plural.

Also, in an aspect of the present invention, the search result detecting module 830 may include a group generating module (not illustrated) to group at least one object included in the class according to a predetermined criterion to generate a group, and a detecting module (not illustrated) to detect a search result corresponding to the information request from the user using at least one of the object, property, class, and group. In this instance, the detecting module (not illustrated) detects the search result corresponding to the information request using respective correlations of the object, property, class, and group.

Also, in as aspect of the present invention, the detecting module (not illustrated) may include a sub-class generating module (not illustrated) to generate a subordinate sub-class having an additional property in addition to a property of the class, and a result detecting module (not illustrated) to detect a search result corresponding to the information request from the user using at least one of the object, property, class, sub-class, and group. In this instance, the result detecting module (not illustrated) detects a search result corresponding to the information request using respective correlations of the object, property, class, sub-class, and group.

A method for user-centered information search according to exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A method using a processor for user-centered information search, the method comprising:
   receiving a search request;
   determining, by the processor, a first object of the search request by using keyword information of the search request and generating one or more first properties which are related to the first object, the first object and the one or more first properties comprising a classification unit of an information search structure, wherein the first object and the one or more first properties are expressed by the keyword information of the search request;
   determining, by the processor, one or more second objects and one or more second properties corresponding to the one or more second objects, the one or more second objects being related to the one or more first properties, wherein a class is generated to define one or more objects; and
   providing a search result corresponding to the search request by using at least one of the first object, the one or more first properties corresponding to the first object and the one or more second objects corresponding to the one or more first properties, the one or more second properties corresponding to the one or more second objects, and, the class comprising a group.

2. The method of claim 1, wherein the one or more of the first and the second properties comprise at least one of a specific character, contents, an expression, detail information, or source associated with the first object or the one or more second objects.

3. The method of claim 1, wherein the first object and the one or more second objects are generated using at least one of a query log analysis, a related-search word analysis, a document analysis, an operator input, or an external database interlock.

4. The method of claim 3, wherein the one or more of the first and the second properties are generated using at least one of an object prefix analysis, an object suffix analysis, an object-related search word analysis, an object click analysis, an object document analysis, an operator input, or the external database interlock.

5. The method of claim 1, further comprising:
   grouping at least one object into a group according to a classification criterion to generate a class; and determining one or more properties of the class using at least one object of the class.

6. The method of claim 5, wherein the one or more properties of the class is a common property to the at least one object of the class.

7. The method of claim 1, wherein the first object, the one or more first properties corresponding to the first object, the class, and the one or more second properties corresponding to the one or more second objects are expressed with the keyword information of the search request.

8. The method of claim 1, further comprising:
providing a search result corresponding to the keyword information of the search request using respective correlations among the first object, the one or more first properties corresponding to the first object and the second properties corresponding to the one or more second objects, the class, and the one or more properties defined by the class.

9. The method of claim 8, wherein a correlation between the first object and the class comprises a category structure of information, wherein the first object and the one or more second objects are subcategories of classification corresponding to an expression of the class.

10. The method of claim 1, further comprising:
displaying one or more of the first properties and the second properties corresponding to the respective objects based on a priority of the respective properties.

11. The method of claim 10, further comprising:
defining a specific data type of the respective properties according to at least one definition criterion of a correct-answer/incorrect-answer type, a static/dynamic type, a contents/link type, or a single/plural type.

12. The method of claim 1, wherein the search result comprises a search-result type search result and a final contents page-type search result.

13. The method of claim 1, wherein the search result comprises at least one of a property corresponding to the search request, a specific data of the respective properties corresponding to the keyword information of the search request, or a related object list corresponding to the keyword information of the search request.

14. The method of claim 1, further comprising:
grouping at least one object of the class according to a criterion to generate a group; and
providing the search result corresponding to the keyword information of the search request using at least one of the first object, the one or more second objects, the one or more first properties and the one or more second properties, the class, and the group.

15. The method of claim 14, further comprising:
providing a search result corresponding to the keyword information of the search request using respective correlations of the first object, the one or more second objects, the one or more first properties and the second properties, the class, the one or more properties corresponding to the class, and the group.

16. The method of claim 15, wherein the respective correlation comprises a category structure of information, and wherein the one or more objects are one of a subcategory of classifications of a specific subject that the class or the group expresses.

17. The method of claim 1, further comprising:
generating a subordinate sub-class comprising a property of the sub-class in addition to the one or more properties of the class; and
providing the search result corresponding to the keyword information of the search request using at least one of the first object, the one or more second objects, the one or more first properties and the one or more second properties, the class, and the group.

18. The method of claim 17, further comprising:
providing a search result corresponding to the search request using respective correlations of the first object, the one or more second objects, the one or more of the first properties and the second properties, the class, the sub-class, one or more properties of the sub-class, and the group.

19. The method of claim 18, wherein respective correlations comprise a hierarchical information structure, the class being in upper-lower relationship with each of sub-class and group, wherein each of the sub-class and group is a specific classification subject.

20. A non-transitory computer-readable storage medium comprising an executable program which, when executed, performs the steps of:
receiving a search request;
determining a first object of the search request by using keyword information of the search request and generating one or more first properties which are related to the first object, the first object and the one or more first properties comprising a classification unit of an information search structure, wherein the first object and the one or more first properties are expressed by the keyword information of the search request;
determining one or more second objects and one or more second properties corresponding to the one or more second objects, the one or more second objects being related to the one or more first properties, wherein a class is generated and to define one or more objects; and
providing a search result corresponding to the search request by using at least one of the first object, the one or more first properties corresponding to the first object and the one or more second objects corresponding to the one or more first properties, the one or more second properties corresponding to the one or more second objects, and the class comprising a group.

21. A system for user-centered information search, the system comprising:
a non-transitory storage medium and a processor coupled to one or more modules executed by the processor;
upon detection of a search request, an object/property generating module configured to determine a first object of the search request by using a keyword information of the search request and to generate one or more first properties which are related to the first object, the first object and the one or more first properties comprising a classification unit of an information search structure, wherein the first object and one or more first properties are expressed by the keyword information of the search request;
a class conducting module to generate a class to define the one or more objects, wherein one or more second objects and one or more second properties corresponding to the one or more second objects are determined, and wherein the one or more second objects are related to the one or more first properties; and
a search result detecting module to provide a search result corresponding to the search request by using at least one of the first object, the one or more first properties corresponding to the first object and the one or more second objects corresponding to the one or more first properties, the one or more second properties corresponding to the one or more second objects, and the class comprising a group.

22. The system of claim 21, wherein the object/property generating module comprises:
- an object generating module to generate the first object, and the one or more second objects being a target of information as a classification unit of the information search structure; and
- a property generating module to generate the respective properties corresponding the first object and the one or more second objects, the respective properties relating to the first object and the one or more second objects.

23. The system of claim 22, wherein the respective properties corresponding to the first object and the one or more second objects are at least one of a specific character, contents, expression form, detail information, or a source of the first object and one or more second objects.

24. The system of claim 22, wherein the first object and the one or more second objects are generated using at least one of a query log analysis, a related-search word analysis, a document analysis, an operator input, or an external database interlock.

25. The system of claim 24, wherein the respective properties corresponding to the first object and the one or more second objects are generated using at least one of an object prefix analysis, an object suffix analysis, an object-related search word analysis, an object click analysis, an object document analysis, an operator input, or the external database interlock.

26. The system of claim 21, wherein the class conducting module comprises:
- a class generating module to group at least one object into a group according to a classification criterion to generate a class; and
- a property determining module to determine the property of the class using the at least one object of the class.

27. The system of claim 26, wherein the respective properties of the class is a common property to the at least one object within the class.

28. The system of claim 21, wherein the first object and the one or more second objects, the respective properties corresponding to the first object, the class, and the one or more second properties of the class are expressed with at least one keyword information.

29. The system of claim 21, wherein the search result detecting module comprises:
- an information request reception module to receive the keyword information of the search request, the information request comprising the object; and
- a detecting module to provide a search result corresponding to the search request by using at least one of the first object, the one or more first properties and the one or more second properties corresponding to the first object, the class comprising a group.

30. The system of claim 29, wherein the keyword information of the search request comprises at least one of the first object, the one or more second objects, or the one or more of the first and the second properties.

31. The system of claim 29, wherein the detecting module is configured to detect the search result corresponding to the keyword information of eh search request using correlations of the respective objects, the one or more properties of the respective objects, the class, the one or more properties of the class, and the group.

32. The system of claim 31, wherein the detecting module comprises:
- a sub-class generating module to generate a subordinate sub-class comprising a property of the subclass in addition to the property of the class; and
- a result detecting module to detect the search result corresponding to the information request using at least one of the respective objects, the one or more properties of the respective objects, the class, the one or more properties of the class, the sub-class, the one or more properties of the sub-class, and the group.

33. The system of claim 32, wherein the result detecting module is configured to detect a search result corresponding to the information request using correlations of the respective objects, the one or more properties of the object, the class, the one or more properties of the class, the sub-class, the one or more properties of the sub-class, and the group.

34. The system of claim 21, wherein the search result detecting module comprises:
- a data generating module to define a specific data type for the respective properties of the first object and the one or more of the second objects, and to generate specific data of the specific type;
- a priority determining module to determine a display order priority among at least one property of the respective objects; and
- a detecting module to detect a search result corresponding to the keyword information of the search request using at least one of the respective objects, the corresponding properties of the respective objects, the class, the one or more objects of the class.

35. The system of claim 34, wherein data type is defined according to at least one definition criterion of a correct-answer/incorrect-answer type, a static/dynamic type, a contents/link type, and a single/plural type.

36. The system of claim 21, wherein the search result detecting module comprises:
- a group generating module to group at least one object included in the class according to a criterion to generate a group; and
- a detecting module to detect a search result corresponding to the keyword information of the search request using at least one of the respective objects, the one or more properties of the respective objects, the class, the one or more properties of the class, and the group.

* * * * *